(12) United States Patent
Wright

(10) Patent No.: US 11,917,287 B2
(45) Date of Patent: Feb. 27, 2024

(54) SYSTEM FOR ALIGNING AN ITEM ALONG A PATH IN AN AREA

(71) Applicant: VIRTUALINE PTY LTD, Victoria (AU)

(72) Inventor: Matthew Wright, Victoria (AU)

(73) Assignee: VIRTUALINE PTY LTD, Victoria (AU)

( * ) Notice: Subject to any disclaimer, the term of this patent is extended or adjusted under 35 U.S.C. 154(b) by 0 days.

(21) Appl. No.: 17/631,134

(22) PCT Filed: Dec. 18, 2019

(86) PCT No.: PCT/AU2019/051394
§ 371 (c)(1),
(2) Date: Jan. 28, 2022

(87) PCT Pub. No.: WO2021/016648
PCT Pub. Date: Feb. 4, 2021

(65) Prior Publication Data
US 2022/0264027 A1    Aug. 18, 2022

(30) Foreign Application Priority Data
Jul. 31, 2019    (AU) ................................. 2019902723

(51) Int. Cl.
*H04N 23/63* (2023.01)
*H04N 23/66* (2023.01)
(Continued)

(52) U.S. Cl.
CPC ......... *H04N 23/633* (2023.01); *H04N 23/631* (2023.01); *H04N 23/66* (2023.01); *H04N 23/69* (2023.01); *H04N 23/695* (2023.01)

(58) Field of Classification Search
CPC ...... H04N 23/633; H04N 23/66; H04N 23/69; H04N 23/695; H04N 23/631
(Continued)

(56) References Cited

U.S. PATENT DOCUMENTS

| 8,675,073 | B2 | 3/2014 | Aagaard et al. | |
| 8,704,904 | B2 * | 4/2014 | Boyle | H04N 23/66 348/211.99 |

(Continued)

FOREIGN PATENT DOCUMENTS

CN    108195361 A    6/2018

OTHER PUBLICATIONS

International Search Report from International Application No. PCT/AU2019/051394, dated Feb. 19, 2020.
(Continued)

*Primary Examiner* — Pritham D Prabhakher
(74) *Attorney, Agent, or Firm* — Westman, Champlin & Koehler, P.A.

(57) ABSTRACT

A system for aligning an item along a path in an area comprising: a camera configured to capture an image containing part of the area and the item; a first transceiver connected to the camera to read the image from the camera; a second transceiver coupled to the first transceiver; a display connected to the second transceiver; wherein the first transceiver is configured to transmit the image to the second transceiver, the second transceiver is configured to transmit the image to the display in order to present the image on the screen of the display, and the transmitted image or the screen of the display includes a reference path, the reference path visible on the screen representing the path in the area; wherein the reference path is configured on the screen such
(Continued)

that alignment of the reference path with the item in the image indicates alignment of the item in the area with the path in the area.

21 Claims, 4 Drawing Sheets

(51) Int. Cl.
*H04N 23/69* (2023.01)
*H04N 23/695* (2023.01)

(58) Field of Classification Search
USPC .......................................... 348/211.8
See application file for complete search history.

(56) References Cited

U.S. PATENT DOCUMENTS

| | | | |
|---|---|---|---|
| 8,749,634 B2* | 6/2014 | Taylor .................... | G01S 19/14 |
| | | | 348/157 |
| 8,903,516 B2 | 12/2014 | Trzcinski et al. | |
| 9,182,229 B2 | 11/2015 | Grässer et al. | |
| 9,341,473 B2* | 5/2016 | Zogg ..................... | G01C 15/002 |
| 9,354,057 B2* | 5/2016 | Bank ..................... | G01C 15/006 |
| 9,367,962 B2* | 6/2016 | Di Federico ............. | G06T 7/73 |
| 9,377,301 B2* | 6/2016 | Neier ..................... | G01S 17/87 |
| 9,377,885 B2* | 6/2016 | Bridges .................. | G06F 3/041 |
| 9,523,575 B2 | 12/2016 | Kumagai et al. | |
| 9,633,246 B2* | 4/2017 | Bank ...................... | H04N 23/63 |
| 9,645,279 B2* | 5/2017 | Weiner .................... | G01V 8/10 |
| 9,733,081 B2* | 8/2017 | Zimmermann .......... | G01C 7/00 |
| 9,772,394 B2* | 9/2017 | Nagalla ................. | G01B 11/002 |
| 10,048,069 B2* | 8/2018 | Romero ................. | G01C 15/04 |
| 10,240,924 B2* | 3/2019 | Metzler ................. | G01C 15/002 |
| 10,469,754 B2* | 11/2019 | Nagashima .......... | H04N 23/633 |
| 10,563,980 B2* | 2/2020 | Edelman ................. | G01S 19/49 |
| 10,609,518 B2* | 3/2020 | Hallett ................... | H04W 4/029 |
| 10,620,006 B2* | 4/2020 | Hallett ................... | G01C 15/002 |
| 11,158,127 B2* | 10/2021 | Mitchell ................. | G01S 19/14 |
| 2008/0180319 A1* | 7/2008 | Islam ...................... | G01C 15/00 |
| | | | 342/357.48 |
| 2012/0166137 A1* | 6/2012 | Grasser .................. | G01C 15/06 |
| | | | 702/150 |
| 2012/0242830 A1* | 9/2012 | Kumagai ............. | G01C 15/002 |
| | | | 348/135 |
| 2012/0293678 A1* | 11/2012 | Amor Molares .. | H04N 1/00323 |
| | | | 348/222.1 |
| 2013/0162469 A1* | 6/2013 | Zogg ...................... | G01S 19/14 |
| | | | 342/357.52 |
| 2013/0278759 A1* | 10/2013 | Zimmermann .......... | G01C 7/00 |
| | | | 348/140 |
| 2015/0085110 A1* | 3/2015 | Pettersson .............. | G01C 15/02 |
| | | | 348/140 |
| 2015/0109509 A1* | 4/2015 | Di Federico ....... | H04N 23/6812 |
| | | | 348/333.02 |
| 2015/0118007 A1* | 4/2015 | Weiner ..................... | G01V 8/20 |
| | | | 414/800 |
| 2015/0156422 A1* | 6/2015 | Neufeld ............... | H04N 23/635 |
| | | | 348/240.3 |
| 2017/0061605 A1* | 3/2017 | Nagashima ............... | G06T 7/70 |
| 2017/0254923 A1* | 9/2017 | Weiner .................... | G01V 8/10 |
| 2018/0284966 A1* | 10/2018 | Irie ..................... | H04N 23/662 |
| 2019/0141470 A1* | 5/2019 | Hallett ................. | H04W 4/029 |

OTHER PUBLICATIONS

European Search Report in corresponding European application No. 19939063.4 dated Jul. 21, 2023.

* cited by examiner

SYSTEM FOR ALIGNING AN ITEM ALONG A PATH IN AN AREA

This application is a U.S. national phase application under 35 U.S.C. of § 371 of International Application No. PCT/AU2019/051394, filed Dec. 18, 2019, which claims priority to Australian Patent Application No. AU 2019902723, filed Jul. 31, 2019, the disclosures of which are all hereby incorporated by reference herein.

FIELD OF THE INVENTION

The present invention relates to a system for aligning an item along a path in an area.

The invention has been developed primarily for use in installing a fence over a path and will be described hereinafter with reference to this application. However, it will be appreciated that the invention is not limited to this particular field of use.

BACKGROUND OF THE INVENTION

Land holders are legally obligated to fence their land. Fencing using conventional plain, barbed or electric wire, must be done accurately and precisely to achieve a strong physical barrier for livestock and to correctly divide land. A fence typically comprises end posts, intermediate posts, wire and stay assemblies. Intermediate posts guide wires off the ground at the correct spacings.

It is a challenge to get all intermediate posts aligned with the two end posts over great distances. Typically, two people are required and an optical aid such as a level or simply visual alignment is used to ensure that subsequent posts are aligned in a straight line between the end posts. However, this is not always an accurate and precise method for applications over large distances.

Another method uses surveying equipment which is complicated to set up and requires at least two people to operate.

Over large distances, the end posts cannot be used as references to place subsequent posts as they may not be visible to the user. Typically, spacing intermediate posts between end posts requires approximations to be made of the position of the next post. When driving posts into the ground adjacent posts such as the most recently driven in post and/or the post adjacent to the recently driven in post are used as a reference to placing the subsequent post. If an error has been made in placing adjacent posts, this error is transferred when placing subsequent posts. Thus, the error can be cumulative and the fence will not be laid in a straight line.

Further, it is increasingly difficult to maintain accuracy using when the topography is variable and human eyesight is relied upon to place the intermediate posts along a straight line between end posts.

There is a need for a better system for placing posts along a straight line across large distances.

If this is not done correctly, land may be incorrectly divided or the fence may not have the requisite mechanical characteristics e.g. in resisting livestock from crossing the barrier.

The present invention seeks to provide a system for aligning an item along a long path, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

In an embodiment, there is provided a system for aligning an item along a path in an area, the system comprising: a camera configured to capture an image containing at least part of the area and the item; a first transceiver connected to the camera to read the image from the camera; a second transceiver operably coupled to the first transceiver; a display connected to the second transceiver, the display including a screen; wherein the first transceiver is configured to transmit the image to the second transceiver, the second transceiver is configured to transmit the image to the display in order to present the image on the screen of the display, and the transmitted image or the screen of the display includes a reference path, the reference path visible on the screen representing the path in the area; wherein the reference path is configured on the screen such that alignment of the reference path with the item in the image indicates alignment of the item in the area with the path in the area.

The path may be a first straight line in the area and the reference path may be a second straight line extending vertically through the centre of the screen.

The transmitted image or screen of the display may also include a horizontally extending reference line.

The horizontally extending reference line may be configured such that it intersects the reference path in the transmitted image or on the screen at right angles.

The horizontally extending reference line may be configured to represent a height at a predetermined offset from a desired height of the item.

The system may further comprise a dock for docking the display.

The system may further comprise a camera mounting apparatus operably connected to the camera to adjust orientation of the camera.

The camera mounting apparatus may include a servo motor to adjust the orientation of the camera.

The dock may comprise a first actuator configured to generate a first control signal to zoom the camera.

The dock may comprise a second actuator configured to generate a second control signal to adjust the orientation of the camera.

The dock may include the second transceiver.

The screen may be a touchscreen.

The touchscreen may be configured to generate a first control signal to zoom the camera, upon a physical interaction with a user.

The touchscreen may be configured to generate a second control signal to drive the servo motor in order to adjust the orientation of the camera, upon a physical interaction with a user.

The system may further comprise a third transceiver operably connected to the display for transmitting the first control signal to zoom the camera.

The third transceiver may also be operably connected to the display for transmitting the second control signal to drive the servo motor in order to adjust the orientation of the camera.

The dock may also include the third transceiver.

The system may further comprise a fourth transceiver operably connected to the camera for receiving the first control signal and transmitting the first control signal to the camera to adjust the zoom of the camera.

The fourth transceiver may be operably connected to the camera for receiving the second control signal and transmitting the second control signal to the camera mounting apparatus to drive the servo motor in order to adjust the orientation of the camera.

The screen may be an LCD screen

The display may be portable.

The display may be part of an electronic device such as a tablet or a smartphone.

In the embodiment where the display is part of an electronic device, the electronic device may include the second transceiver.

In the embodiment where the display is part of an electronic device, the electronic device may include the third transceiver.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF EMBODIMENTS

Figure 1:
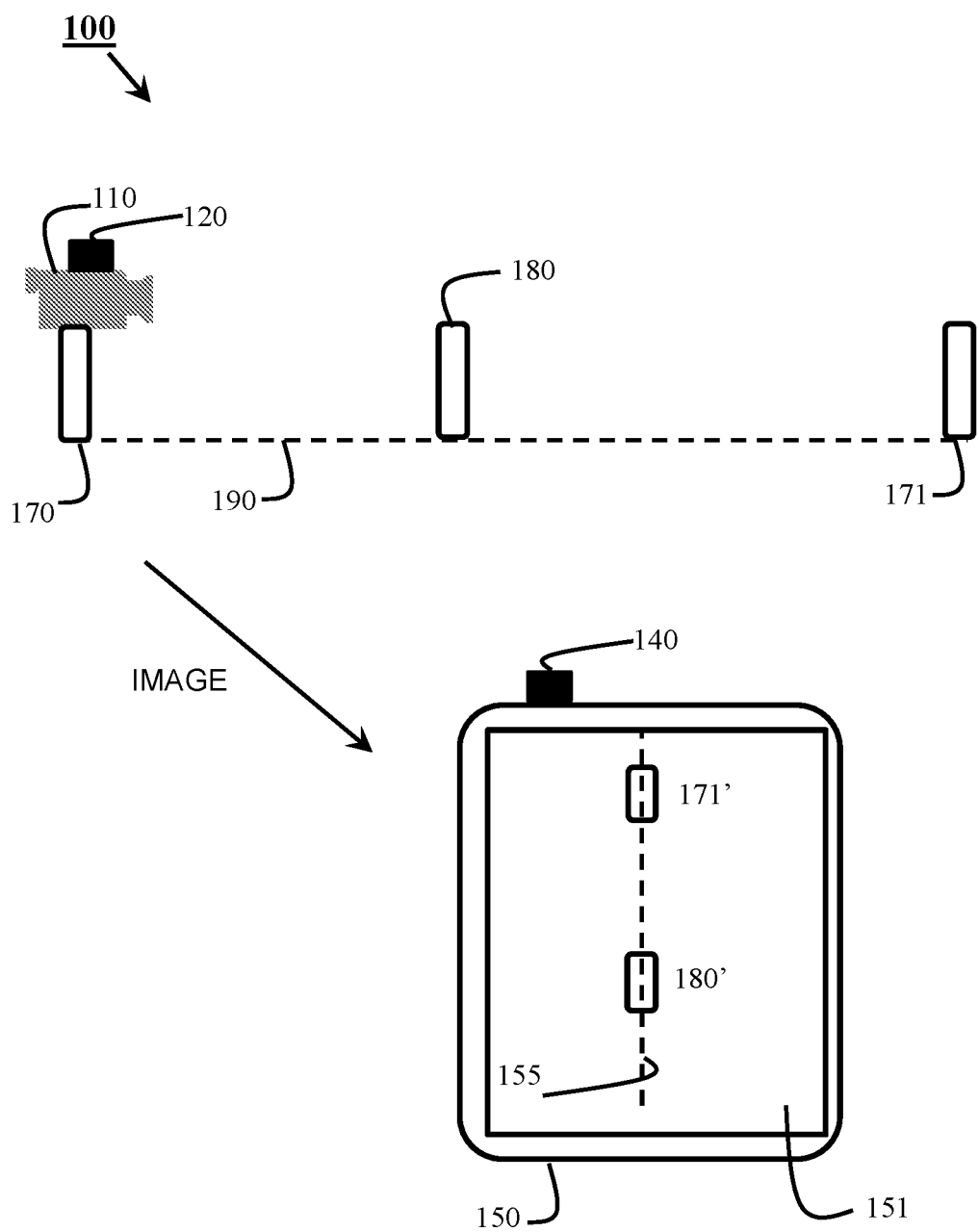
FIG. 1 illustrates a system for use in installing an item along a path in an area in accordance with an embodiment of the present invention.

It should be noted in the following description that like or the same reference numerals in different embodiments denote the same or similar features.

FIG. 1 illustrates a system 100 for use in installing an item 180, particularly, an intermediate fence post of a fence, along a path 190 in an area in accordance with an embodiment of the present invention. While installation of a single intermediate fence post is described, the system can be used to install multiple fence posts.

In the example shown in FIG. 1, the path 190 is a straight line defined by two end posts 170, 171 located at the ends of the path 190. It is to be understood that the system 100 is not limited to the particular application illustrated in FIG. 1 and can have multiple applications in multiple industries.

For easy description purposes, the system 100 is described with reference to a first part and a second part. The first part of the system 100 includes a camera 110 that is configured to capture an image. The camera 110 is configured such that it can capture an image along the path 190. The image contains at least part of the area and the intermediate fence post 180 to be installed along the path 190. In the example shown in FIG. 1, the path 190 is a linear path. In another example, the path 190 can be non-linear. The first part of the system 100 also includes a first transceiver 120 that is operably connected to the camera 110. The first transceiver 120 reads the image from the camera 110. The first transceiver 120 can be incorporated into or mounted on the camera 110.

As shown in FIG. 1, the second part of the system 100 includes a second transceiver 140 operably coupled to the first transceiver 120. The second part of the system 100 further includes a display 150 connected to the second transceiver 140. The second transceiver 140 can be incorporated into or mounted on the display 150. The display 150 also includes a screen 151.

In the example shown in FIG. 1, the first transceiver 120 wirelessly communicates with the second transceiver 140. The first transceiver 120 and second transceiver 140 can be configured to transmit and receive information and data via various types of wireless networks, for example, wireless cellular networks, WIFI networks or any other suitable wireless networks. Therefore, the first and second transceivers 120, 140 could be wireless cellular network transceivers, WIFI, Bluetooth transceivers or other suitable wireless transceivers. An advantage of using wireless transceivers is that the first part of the system 100 does not need to be close to the second part of the system 100 for signals to be effectively transmitted between the transceivers 120, 140.

In the system 100 shown in FIG. 1, the first transceiver 120 is configured to transmit the image captured to the second transceiver 140. The second transceiver 140 in turn transmits the image to the display 150. Upon receipt of the image from the second transceiver 140, the display 150 is configured to display the image on the screen 151.

The screen 151 of the display 150 also shows a reference path 155, shown as a dashed line in FIG. 1. It should be noted that the reference path 155 can be a digital representation that is superimposed on the image shown on the screen 151 or a physical marking on the screen 151 of the display 150. The reference path 155 can also be defined by a physical marking within the eyepiece of the camera 110, e.g. a reticle. In an embodiment, the camera 110 can include a scope (not shown) having a first focal plane and/or a second focal plane. The reticle can be located in the first focal plane or the second focal plane of the scope. The reticle can be shaped as cross hairs i.e. having a vertical and a horizontal component. In use, the first transceiver reads the image through the eyepiece such that the read image includes the cross hairs and sends the image including the cross hairs to the second transceiver.

When a person uses the system 100 to install the intermediate fence post 180 along the path 190 in the area, the person co-locates the first part (particularly, the camera 110) of the system 100 with one of reference marks. In the example shown in FIG. 1, the two reference marks are the end posts 170, 171 that are already placed at the ends of the path 190. In another example, the reference marks can be rocks, trees, or any marks that are able to define the direction of the path 190.

The person secures the first part of the system 100 on the first end post 170 and orientates the camera 110 towards the second end post 171 in order to capture the image that contains the path 190 defined by the first end post 170 and the second end post 171. As described above, the image is read by the first transceiver 120 from the camera 110 and transmitted to the second part of the system 100 particularly, the second transceiver 140. The person carries the second part of the system 100 and is able to view the image on the screen 151 of the display 150. The second end post 171 is denoted as 171' in the image, as shown in FIG. 1.

The person adjusts the orientation of the camera 110. Once the second end post 171' in the image is aligned with the reference path 155 on the screen 151, as shown in FIG. 1, this means the camera 110 is orientated correctly. As a result, the reference path 155 is configured such that when the image is displayed on the screen 151, the reference path 155 is also visible on the screen 151 and represents the path 190 in the area, along which the intermediate fence post 180 will be installed. The person then moves between the first end post 170 and the second end post 171 carrying the second part of the system 100 and the intermediate fence post 180 in order to find a position where the intermediate fence post 180 needs to be installed along the path 190. For example, when the person moves between the first end post 170 and the second end post 171, the person is able to view himself or herself and the intermediate fence post 180 on the screen 151 of the display 150 because the camera 110 constantly captures the image(s), in real-time, between the first end post 170 and the second end post 171 and transmits the image(s) to the display 150. The intermediate fence post 180 is denoted as 180' in the image, as shown in FIG. 1 (the person is not shown in FIG. 1 for easy illustration). If the intermediate fence post 180' in the image is aligned with the reference path 155 on the screen 151, as shown in FIG. 1, this means the intermediate fence post 180 in the area is physically aligned with the path 190 in the area because the reference path 155 on the screen 151 represents the path 190 in the area. Therefore, when the person finds a position between the end posts 170, 171 where the intermediate fence post 180' in the image overlaps with the reference path 155 on the screen 151, the position is on the path 190 in the area and the intermediate fence post 180 needs to be installed at the position. This way, even if the path 190 in the area is invisible to the person, the person is still able to position the intermediate fence post 180 along the path 190 in the area accurately.

In the illustrated example, the first part (particularly, the camera 110) of the system 100 is co-located with one of the reference marks, i.e., the end post 170, and the reference path 155 visible on the screen is a straight line extending vertically across the screen 151. The reference path 155 is also centrally located on the screen 151, as shown in FIG. 1. However, in another example where the first part of the system 100 is not co-located with any of the reference marks, the camera 110 is orientated by the person to capture an image containing the two reference marks. The image is transmitted to a processor (not shown) included in the system 100. The processor can be included in the first part or the second part of the system 100. The processor is configured to automatically recognise the two reference marks from the image and generate the reference path 155 in the image by for example generating a straight line connecting the two reference marks in the image. As a result, the reference path 155 in the image represents the path 190 in the area. The reference path 155 and the image are visible on the screen 151 of the display 150. This way, the person is able to view the reference path 155 on the screen 151 in order to determine the position on the path 190 in the area to install the intermediate fence post 180 at the position.

As a further example, the path 190 could be a non-linear path defined by more than two reference marks. In this case, the processor is configured to recognise the reference marks in the image and generate a multi-segment line in the image connecting the adjacent reference marks in the image. The multi-segment line is presented on the screen 151 as the reference path 155 to represent the path 190 in the area. As a further example, instead of generating the multi-segment line as the reference path 155, the processor can also be configured to generate a curve in the image as the reference path 155 based on the reference marks in the image to represent the path 190 in the area. For example, the processor is configured to generate the curve by, for example, interpolating the reference marks in the image, extrapolating the reference marks in the image, or using other suitable curve fitting algorithms.

In an embodiment, the first part of the system 100 can be implemented as part of a computing device with image capturing and transmission capabilities, for example, a tablet computer or a smart phone. Similarly, the second part of the system 100 can also be implemented as part of a computing device with image receiving and presentation capacities, for example, a tablet computer or a smart phone. Therefore, the screen 151 of the display 150 can be an LCD screen or a touchscreen. Of course, the system 100 can be implemented without using existing tablet computers or smart phones, which does not depart from the scope of the present invention.

Figure 2:
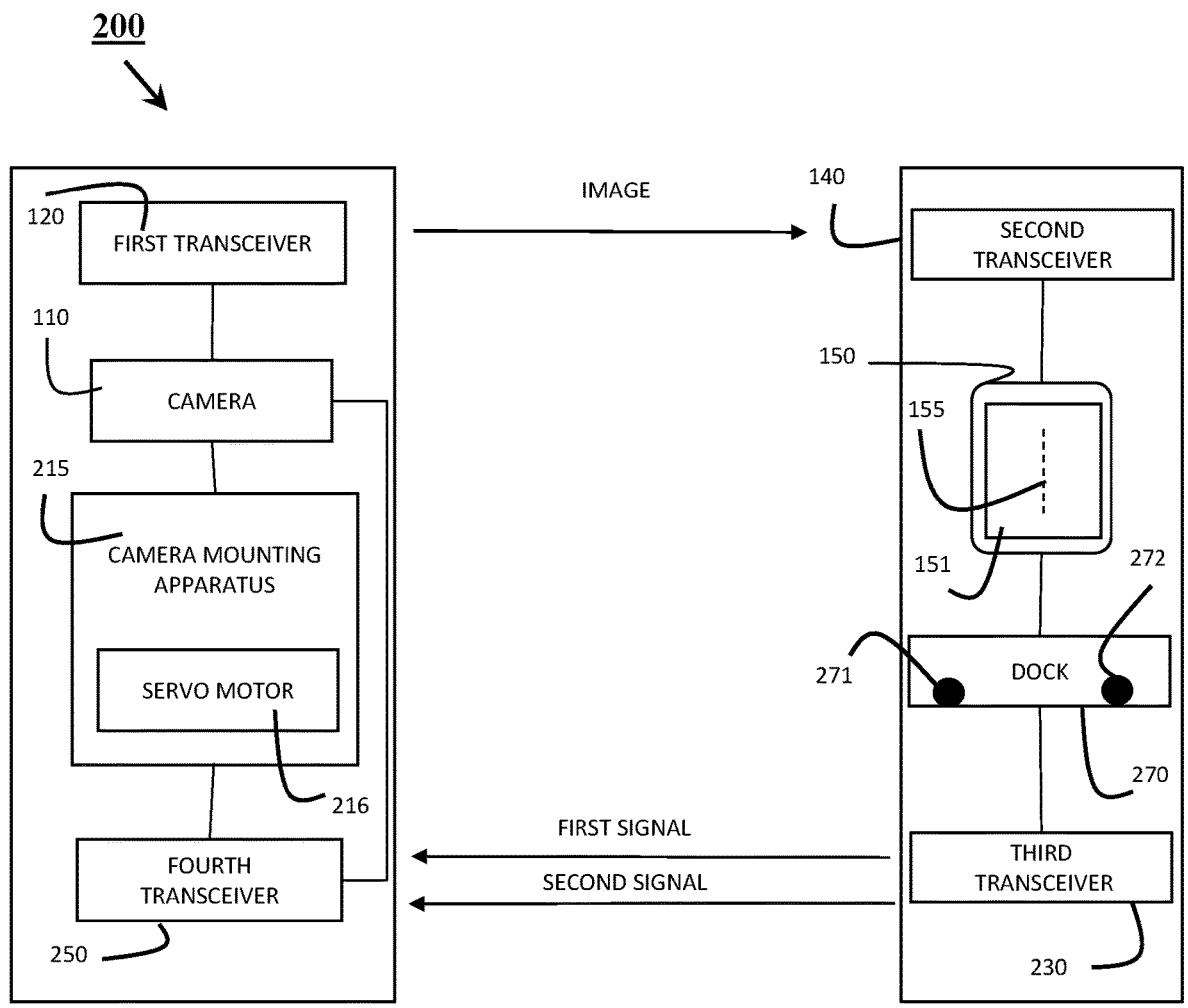
FIG. 2 illustrates a diagram of a system for use in installing an item along a path in an area in accordance with another embodiment of the present invention.

FIG. 2 illustrates a diagram of system 200 for use in installing an item along a path in an area in accordance with another embodiment of the present invention. In the embodiment shown in FIG. 2, in addition to the elements shown in FIG. 1, the system 200 further includes a camera mounting apparatus 215 operably connected to the camera 110 in the first part of the system 200 to enable adjustment of the orientation of the camera 110. The camera mounting apparatus 215 can include a base (not shown) for supporting the camera 110 when it is mounted and a bracket (not shown) upon which the camera 110 is mounted. The base can be configured to attach to a variety of different objects. The base or bracket can be manipulated to tilt the camera 110 3-dimensionally i.e. up and down, sideways towards the left and right sides of the camera 110, and the front and back of the camera 110.

The camera 110 can be directly tilted and/or panned by the user or the base or bracket can be remotely controlled to tilt or pan the camera 110. In an embodiment, the camera mounting apparatus 215 can include a gear arrangement such as a worm drive system or other mechanical means manually operable to tilt and/or pan the camera 110 as required. In another embodiment, the camera mounting apparatus 215 can include a motor which can be operated by an actuator (e.g. a button).

In other embodiments, the camera mounting apparatus 215 can be remotely controlled to tilt or pan the camera 110. In these embodiments the camera mounting apparatus 215 can include a motor which is able to be remotely controlled, for example, from the second part of the system 200.

In the illustrated embodiment, the camera mounting apparatus 215 includes a servo motor 216. The servo motor 216 can be controlled by control signals and is operably connected to the bracket or the base. The servo motor 216 is configured to adjust the orientation of the camera 110 via manipulation of the bracket or the base.

In the embodiment illustrated in FIG. 2, the first part of the system 200 further includes a fourth transceiver 250 connected to the camera 110. As shown in FIG. 2, the fourth transceiver 250 is also connected to the camera mounting apparatus 215. This way, the fourth transceiver 250 is able to receive signals from the second part of the system 200 and transmit the signals to the camera mounting apparatus 215 or the camera 110.

The system 200 further includes a dock 270 in the second part of the system 200, which is configured for docking the display 150. The dock 270 includes actuators for functions such as controlling the zoom of the camera 110 and/or the orientation of the camera 110. For example, the actuators of the dock 270 can be buttons which send signals upon being actuated or pressed.

In the embodiment illustrated in FIG. 2, the dock 270 comprises a first actuator 271. The first actuator 271 is configured to generate a first control signal when it is actuated, for example, when the person pushes the first actuator 271 with a finger of the person. The second part of the system 200 further includes a third transceiver 230 operably connected to the first actuator 271 for receiving the first control signal from the first actuator 271. The third transceiver 230 transmits the first control signal to the fourth transceiver 250 in the first part of the system 200. Upon receipt of the first control signal at the fourth transceiver 250, the fourth transceiver 250 transmits the first control signal to the camera 110 to control the zoom of the camera 110.

Advantageously, the camera 110 is configured to zoom in to view items placed at long distances from the camera 110 such as the entire length of a new fence. The fence could have a length greater than or less than 100 m. In the context of laying a new fence, this means that if the camera 110 is attached to an end post and is configured to view the entire length of a fence, each intermediate fence post can be viewed clearly on the screen 151 along the entire length of the fence when the zoom function is used. Hence, an entire fence greater than or less than 100 m can be accurately installed while the camera 110 is mounted on one end post.

The dock 270 also comprises a second actuator 272 configured to generate a second control signal. When the second actuator 272 is actuated, a second control signal is generated and transmitted to the third transceiver 230. Upon receipt of the second control signal, the third transceiver 230 transmits the second control signal to the fourth transceiver 250. The fourth transceiver 250 then transmits the second control signal to the camera mounting apparatus 215 to drive the controllable servo motor 216 of the camera mounting apparatus 215 to adjust the orientation of the camera 110. Advantageously, remotely adjusting the orientation of the camera 210 allows for the user to maintain sight of the intermediate fence post 180 on the screen 151 of the display 150 if the terrain is undulating or otherwise uneven.

Multiple configurations other than the ways described of the second part of the system are possible in how the second and third transceivers are connected to other components within the second part of the system, without departing from the scope of the claims. For example, one or both of the second and third transceivers can be incorporated in a dock and/or an electronic device including a display. In another example, actuators for generating and transmitting signals from the third transceiver may be included in the dock while the third transceiver is included in the electronic device.

In another embodiment, the second transceiver 140 can be incorporated in the dock 270. In this embodiment, the third transceiver 230 can also be incorporated in the dock 270. When the display 150 as part of an electronic device such as a tablet or electronic phone is operably connected to the dock 270, the image transmitted from the first transceiver 120 can be displayed on the screen 151. Also, when the display 150 is operably connected to the dock 270, signals can be transmitted from the third transceiver 250 to the camera 110 and/or the camera mounting apparatus 215 via the fourth transceiver 250. In this embodiment, the screen 151 can be a touchscreen. The dock 270 can also be configured to charge the electronic device upon operable connection of the electronic device to the dock 270.

In yet another embodiment, the second transceiver 140 and the third transceiver 230 are incorporated in an electronic device which includes the screen 151. In other words, the second part of the system can be an electronic device including the second and third transceivers. In this embodiment, the screen 151 can also be a touchscreen.

In this embodiment, a dedicated computer application could be downloaded onto the electronic device. The application could present an interactive graphic user interface (GUI) which allows for the user to perform remote zooming and tilting of the camera by physically interacting with the GUI. For example, when a user places their finger on a, for example, "button" or a slider bar on the touchscreen, the touchscreen generates the first control signal to zoom the camera 210. Similarly, when a user interacts physically with the touch screen, the second control signal can be generated to drive the servo motor 216 to adjust the orientation of the camera.

The skilled person will understand that the interactive GUI can be configured in various ways.

An advantage of this system is that only one person is required to install a new fence when using this system in the embodiment where the screen 151 of the display is portable 150. The person could position and install intermediate fence posts in sequence by either manually driving the fence posts in or using a fence post rammer while referring to the portable display screen 151 to verify whether each fence post has been placed correctly.

Figure 3:
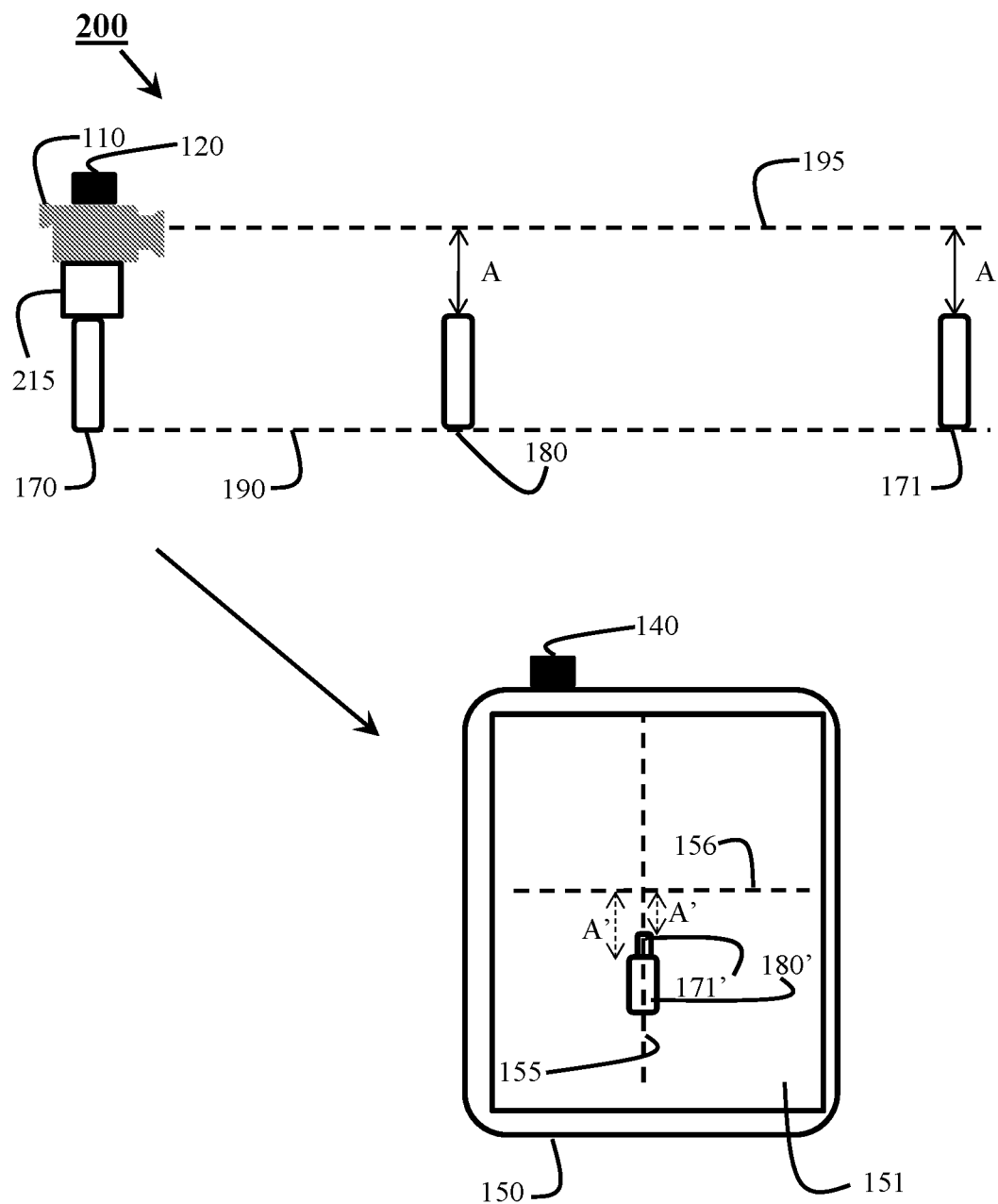
FIG. 3 illustrates another system for use in installing an item along a path in an area in accordance with another embodiment of the present invention.

FIG. 3 illustrates an embodiment of the system in which the transmitted image or screen includes a horizontally extending reference line 156 in addition to a vertically extending reference path 155. As shown in FIG. 3, the horizontally extending reference line 156 intersects the vertically extending reference path 155 at right angles on the screen. Similar to the reference path 155, the horizontally extending reference line 156 can be a physical representation on the screen 150 or a digital representation generated by a processor (not shown) and presented on the screen 150 or the horizontally extending reference line 156 can be part of a reticle within the optics of the camera. In use, the horizontally extending reference line 156 enables the user to verify that each intermediate post installed on the straight path 190 is at a desired height.

As shown in FIG. 3, the camera 110 is mounted on the camera mounting apparatus 215 relative to each intermediate post such that the line of sight 195 of the camera 110 is above and parallel to the physical straight path 190. In particular, the line of sight 195 of the camera 110 is at a pre-determined vertical offset "A" from a desired height of each intermediate post to be installed. Given that the land on which the fence is to be built is flat, all intermediate fence posts installed along the physical path 190 at the desired height will be shown on the screen 150 below the horizontal reference line 156.

When an intermediate post is positioned such that it falls on the straight path 190, it can be driven into the ground such that it extends out of the ground at a desired height. During verification, a portable reference marker such as a ruler set at the offset height "A" can be positioned on the top of the intermediate fence post to be installed. If the screen 150 shows that the total height of the intermediate fence post plus the portable reference marker is such that the reference marker meets the horizontal reference line 156, then the intermediate fence post is at the desired height.

Figure 4:
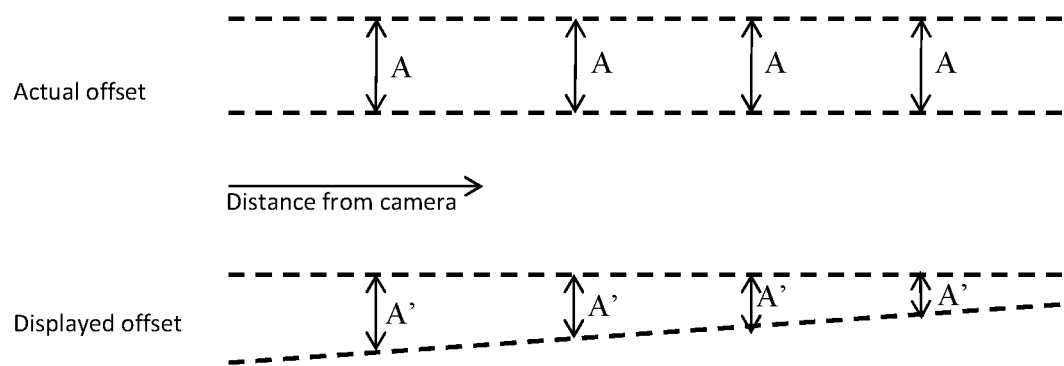
FIG. 4 illustrates the relationship between actual offset between a fence post and the line of sight of the camera and the displayed offset shown on the screen when the embodiment shown in FIG. 3 is used to install fence posts at the same height.

FIG. 4 illustrates the effect on the appearance of the offset, A', on the screen 150 as the distance of the intermediate post from the camera 110 along the straight line path 190 increases. As shown in FIG. 3, post 171 which is further away from the camera 110 will appear smaller on the screen as 171' than post 180 which is closer to the screen and appears as 180'. In the same way, the offset A will appear smaller the further the intermediate post is from the camera 110. Thus, the displayed offset A' shown on the screen 150 will decrease in size as the distance from the camera 110 increases.

This embodiment of the system can be used during installation of fences over flat ground where there is a requirement that the fence posts be installed at the same height. Previously, the fence installer would rely on eyesight to check that the height of an installed fence post was the same as the height of an installed adjacent fence post. This method allows the user to easily check and adjust, as required, the height of each fence post as they are being installed more accurately especially if the spacing between adjacent fence posts is large.

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

The use of the word "connect" and variations thereof e.g. connection, connected etc. are intended in an open manner to refer to direct connection or indirect connection.

I claim:

1. A system for aligning an item along a path in an area, the system comprising:
    a camera configured to capture an image containing at least part of the area and the item;
    a first transceiver connected to the camera to read the image from the camera; a second transceiver operably coupled to the first transceiver;
    a display connected to the second transceiver, the display including a screen;
    wherein the first transceiver is configured to transmit the image to the second transceiver, the second transceiver is configured to transmit the image to the display in order to present the image on the screen of the display, and the transmitted image or the screen of the display includes a reference path, the reference path visible on the screen representing the path in the area;
    wherein the reference path is configured such that alignment of the reference path with the item in the image indicates alignment of the item in the area with the path in the area.

2. The system of claim 1, wherein the path is a first straight line in the area and the reference path is a second straight line extending vertically through the center of the image.

3. The system of claim 2 wherein the transmitted image or screen of the display also includes a horizontally extending reference line.

4. The system of claim 3 wherein the horizontally extending reference line is configured such that it intersects the reference path in the transmitted image or on the screen of the display at right angles.

5. The system of claim 3, wherein the horizontally extending reference line is configured to represent a height at a predetermined offset from a desired height of the item.

6. The system of claim 1, wherein the system further comprises a dock for docking the display.

7. The system of claim 6, wherein the dock comprises a first actuator configured to generate a first control signal to zoom the camera.

8. The system of claim 7, wherein the dock comprises a second actuator configured to generate a second control signal to adjust the orientation of the camera.

9. The system of claim 8, wherein the system further comprises a third transceiver operably connected to the display for transmitting the first control signal to zoom the camera.

10. The system of claim 9, wherein the third transceiver is also operably connected to the display for transmitting the second control signal to drive the servo motor in order to adjust the orientation of the camera.

11. The system of claim 10, wherein the system further comprises a fourth transceiver operably connected to the camera for receiving the first control signal and transmitting the first control signal to the camera to adjust the zoom of the camera.

12. The system of claim 11, wherein the fourth transceiver is operably connected to the camera and/or camera mounting apparatus for receiving the second control signal and transmitting the second control signal to the camera mounting apparatus to drive the servo motor in order to adjust the orientation of the camera.

13. The system of claim 10, wherein the third transceiver is included in an electronic device.

14. The system of claim 1, wherein the system further comprises a camera mounting apparatus operably connected to the camera to adjust orientation of the camera.

15. The system of claim 14, wherein the camera mounting apparatus includes a servo motor to adjust the orientation of the camera.

16. The system of claim 1, wherein the screen is a touchscreen.

17. The system of claim 16, wherein the touchscreen is configured to generate a first control signal to zoom the camera, upon a physical interaction with a user.

18. The system of claim 17, wherein the touchscreen is configured to generate a second control signal to drive a servo motor in order to adjust the orientation of the camera, upon a physical interaction with a user.

19. The system of claim 1, wherein the display and the second transceiver are included in an electronic device.

20. The system of claim 1, wherein the screen is an LCD screen.

21. The system of claim 1, wherein the display is portable.

* * * * *